United States Patent [19]

Ueta

[11] Patent Number: 4,721,315
[45] Date of Patent: Jan. 26, 1988

[54] METALLIC CYLINDER HEAD GASKET

[75] Inventor: Kosaku Ueta, Urawa, Japan

[73] Assignee: Nihon Metal Gasket Kabushiki Kaisha, Kumagaya, Japan

[21] Appl. No.: 49,008

[22] Filed: May 11, 1987

Related U.S. Application Data

[63] Continuation of Ser. No. 916,251, Oct. 7, 1986, abandoned.

[30] Foreign Application Priority Data

Dec. 27, 1985 [JP] Japan .................. 60-292894

[51] Int. Cl.⁴ ............................................. F16J 15/08
[52] U.S. Cl. .................. 277/235 B; 277/207 R; 277/236
[58] Field of Search ............. 277/166, 207 R, 211, 277/235 A, 235 B, 235 R, 236

[56] References Cited

U.S. PATENT DOCUMENTS

| | | |
|---|---|---|
| 1,851,948 | 3/1932 | Summers . |
| 2,152,630 | 4/1939 | Balfe ................. 277/235 B X |
| 4,196,913 | 4/1980 | Oka . |
| 4,372,564 | 2/1983 | Nicholson . |
| 4,465,287 | 8/1984 | Bindel et al. ................. 277/235 B |
| 4,471,968 | 9/1984 | Shlaupitz et al. ........... 277/235 B X |
| 4,519,619 | 5/1985 | Doyle . |

FOREIGN PATENT DOCUMENTS

| | | |
|---|---|---|
| 1452723 | 3/1966 | France . |
| 931710 | 7/1963 | United Kingdom .......... 277/235 B |
| 1370125 | 5/1974 | United Kingdom . |

*Primary Examiner*—Robert S. Ward
*Attorney, Agent, or Firm*—Flynn, Thiel, Boutell & Tanis

[57] ABSTRACT

A metallic gasket including: an elastic metal base plate having a circular bead surrounding a combustion chamber hole, and a compensating portion provided on the inner edge part of the base plate so as to directly surround this hole. The spring constant of the bead increases as the distance from the fastening bolts increases to allow uniform sealing pressure. The thickness of the compensating portion gradually increases as the distance from the fastening bolt increases.

12 Claims, 7 Drawing Figures

METALLIC CYLINDER HEAD GASKET

This application is a continuation, of U.S. Ser. No. 916,251, filed Oct. 7, 1986, now abandoned.

FIELD OF THE INVENTION

The present invention relates to a metallic gasket and, more particularly, to a metallic gasket in which a gap between the deck surfaces around a combustion chamber which is caused when a cylinder head is fastened can be compensated and the increase and decrease in the deck surface gap due to influences of combustion gas pressure and engine heat can be prevented, thereby enabling a stable and effective sealing performance to be accomplished.

The invention further relates to a metallic gasket in which a spring constant or rate at a location away from the bolt fastening position is set to a large value and a uniform sealing pressure is applied to the sealing portion and, at the same time, the increase and decrease in the deck surface gap can be prevented and a stable and effective sealing performance can be attained.

DESCRIPTION OF THE PRIOR ART

A metallic gasket is used in the joint area between the cylinder head and the cylinder block constituting an internal combustion engine. The metallic gasket has one or a plurality of beads which are formed so as to seal the deck surfaces between the cylinder head and the cylinder block. These beads form elastic sealing lines on the deck surfaces due to the fastening forces of fastening means such as bolts or the like joining the members to be joined, thereby providing the sealing performance.

However, when the cylinder head is fastened to the cylinder block through the metallic gasket by the fastening bolts, the cylinder head is curved due to the bolt fastening forces and, particularly, the gap between the cylinder head and the cylinder block around the combustion chamber increases, so that distortions occur. Thus, there are problems such that the combustion gas leaks from the positions where those distortions occurred and the metallic gasket interposed in the joint area is polluted, and the sealing performance deteriorates due to the deposit of the materials contained in the combustion gas. In addition, when the combustion engine operates, the gap between the deck surfaces around the combustion chamber increases or decreases due to influences of, e.g., the combustion gas pressure and engine heat, so that fatigue occurs in the beads of the metallic gasket due to the alternating load. This alternating load also acts on the fastening bolts and causes the bolts and cylinder head portions with which the bolts are engaged to be damaged. Further, there are problems such that the fastening forces of the bolts are reduced and the sealing effect of the metallic gasket deteriorates.

On one hand, when the cylinder head is fastened to the cylinder block through the metallic gasket by the fastening bolts, the surface pressures of the portions where the bolts are fastened and of the portions away from the fastening portions differ and the surface pressures at the remote positions are lower than those of the bolt fastening portions. Similarly, the sealing pressures at the remote positions are also lower than those of the bolt fastening portions. Thus, there is the drawback such that the combustion gas is likely to leak.

As a method of solving those drawbacks, a method whereby the bolt fastening forces are enlarged has been considered. However, the surface pressures of the bolt fastening portions contrarily increase more than they are needed, so that there is the danger that the deck surfaces will be damaged by the beads. Therefore, it is improper to increase the bolt fastening forces more than they are needed.

In addition, the cylinder head is curved due to the bolt fastening forces and, particularly, the gap between the deck surfaces around the combustion chamber increases, so that distortions occur. Consequently, there are the problems such that the combustion gas leaks from the portions where these distortions occurred and the metallic gasket interposed in the joint area is damaged and the sealing performance deteriorates due to the deposits from the combustion gas. Further, when the combustion engine operates, the gap between the deck surfaces around the combustion chamber increases and decreases due to influences of, e.g., the combustion gas pressure and engine heat, so that the fatigue occurs in the beads of the metallic gasket due to the alternate load. In addition, the alternating load also acts on the fastening bolts as mentioned above and there is the danger that the bolts and cylinder head portions with which the bolts are engaged will be damaged. Moreover, there are also the problems that the bolt fastening forces are reduced and the sealing effect of the metallic gasket deteriorates.

SUMMARY OF THE INVENTION

It is a first object of the present invention to solve the foregoing drawbacks and provide a metallic gasket in which the gap between the deck surfaces around the combustion chamber which is caused when the cylinder head is fastened can be compensated by a compensating portion, and the pollution of the metallic gasket and the deterioration of the sealing effect can be prevented, thereby enabling a stable and effective sealing performance to be accomplished.

It is a second object of the invention to solve the foregoing drawbacks and provide a metallic gasket in which uniform sealing pressure is applied to the sealing portions and the gap between the deck surfaces around the combustion chamber is compensated by the compensating portion, thereby enabling the sealing performance to be improved.

To accomplish these objects, a metallic gasket according to the invention is characterized by the following points. Namely, a combustion chamber hole is formed in a base plate consisting of an elastic metal plate. This base plate is formed with a bead so as to surround the combustion chamber hole. This bead is constituted such that the spring constant of the metallic gasket increases as the distance from the bolt fastening portion increases, thereby allowing a uniform sealing pressure to be applied to the sealing portion. A compensating portion having a thickness which gradually increases as the distance from the side of the bolt fastening portion increases is provided for the base plate so as to surround the combustion chamber hole.

With this constitution of the invention, the metallic gasket interposed in the joint area applies the uniform surface pressure to the deck surfaces at the positions away from the bolt fastening portions and allows a uniform sealing pressure to act on the sealing portion. Also, the large gap between the deck surfaces around the combustion chamber is compensated by the compensating portion. Therefore, the increase and decrease in the gap between the deck surfaces due to the influences of the combustion gas pressure and engine heat are prevented and the sealing performance is improved. Thus, the leakage of the combustion gas is effectively prevented and the action of the alternate load on the bead is weakened. The fatigue of the bead is prevented and the life of the metallic gasket is prolonged.

The above and other objects, features, and advantages of the present invention will be more apparent from the following detailed description in conjunction with the accompanying drawings.

DETAILED DESCRIPTION OF THE PREFERRED EMBODIMENTS

Figure 1:
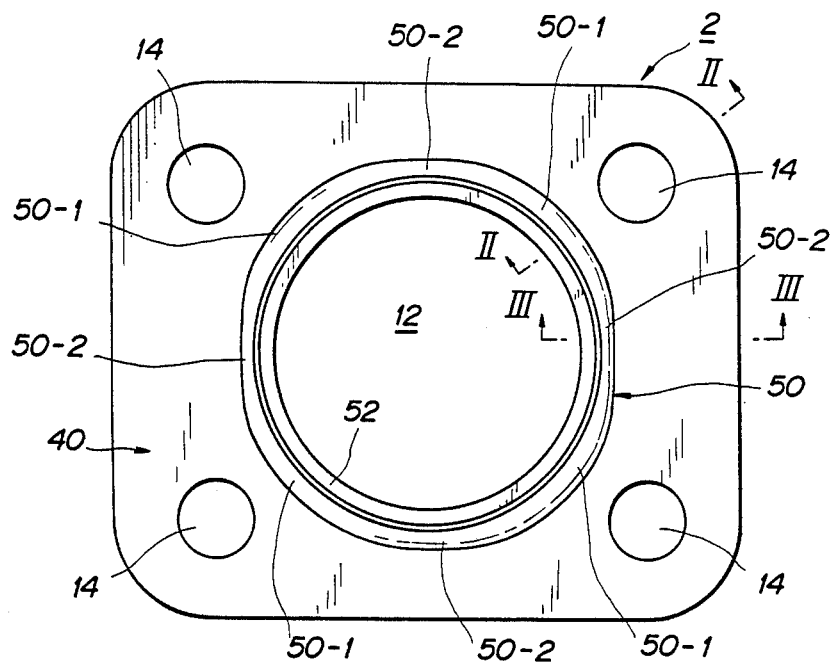
FIG. 1 is a plan view of a metallic gasket according to an embodiment of the invention.

In the drawings, similar or corresponding parts and components are designated by the same reference numerals.

A first embodiment of the invention will be described in detail hereinbelow with reference to FIGS. 1 to 5.

In the drawings, the metallic gasket 2 is formed of a one-piece base plate 40 consisting of an elastic metal plate. A combustion chamber hole 12 is formed in the base plate 40 and a plurality (in this example four) of bolt holes 14 are formed in the base plate 40 around the hole 12. The base plate 40 is formed with an annular bead 50 which surrounds a circumferential edge part 40a of the base plate 40, which edge part 40a surrounds and defines the combustion chamber hole 12. The bead 50 is circumferentially formed inwardly of the bolt holes 14.

Figure 2:
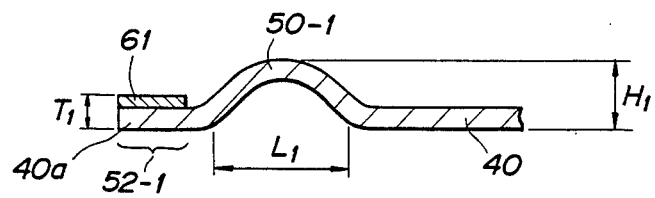
FIG. 2 is an enlarged cross sectional view showing the main part taken along the line II—II in FIG. 1.
Figure 3:
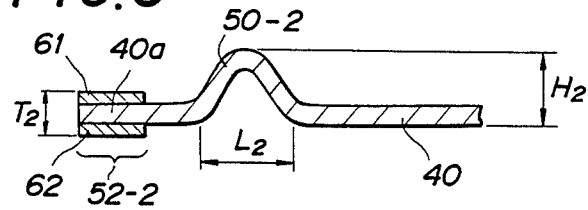
FIG. 3 is an enlarged cross sectional view showing the main part taken along the line III—III in FIG. 1.
Figure 4:
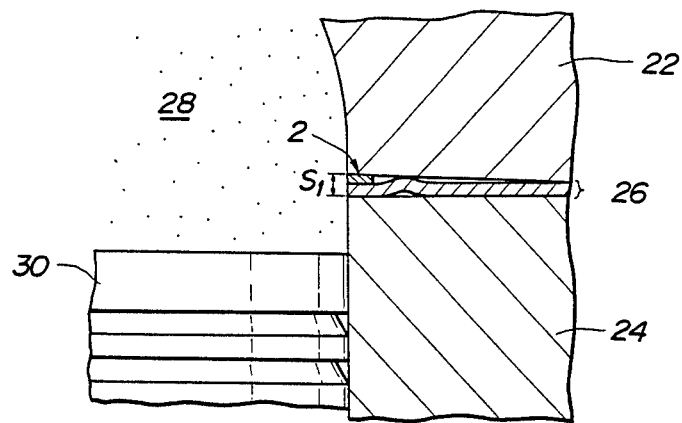
FIG. 4 is a cross sectional view showing the main part with a part omitted in the case where the metallic gasket of the first embodiment is interposed in a joint area and corresponding to FIG. 2.
Figure 5:
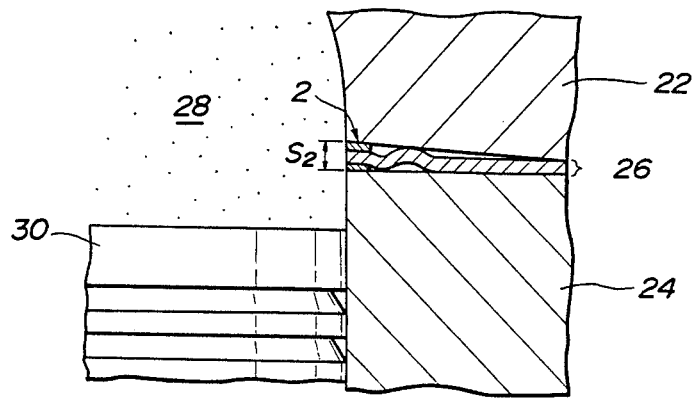
FIG. 5 is a cross sectional view showing the main part with a part omitted in the case where the metallic gasket in the first embodiment is interposed in a joint area and corresponding to FIG. 3.

The bead 50 consists of alternate first and second bead sectors 50-1 and 50-2, respectively, of different cross sectional shapes. The bead sectors 50-1 extend through the plate portions containing the bolt holes 14, whereas bead sectors 50-2 extend through the plate portions which are remote from (i.e., between) the bolt holes. As typically illustrated in FIG. 2, the cross sectional shape of the bead sector 50-1 has a height $H_1$ and a width $L_1$. On the other hand, as shown in FIG. 3, the cross sectional shape of the bead sector 50-2, as it extends between the bolt holes 14 at a position remote from the bolt fastening portion, has a height $H_2$ larger than the height $H_1$ and a width $L_2$ smaller than the width $L_1$. In this case, the value of $H_2$ increases and the value of $L_2$ decreases as the distance from the bolt hole 14 increases. Thus, the metallic gasket 2 is constituted such that its spring constant (i.e., spring rate) as defined by the bead 50 gradually increases as the distance from the bolt hole 14 increases. This is achieved due to the cross section of the sector 50-1 gradually and progressively changing, as it extends circumferentially away from the bolt hole 14, so as to merger into and create the cross section of the sector 50-2. Therefore, when the metallic gasket 2 is interposed in the joint area 26 (FIGS. 4 and 5) and compressed due to the bolt fastening forces, the bead sector 50-1 having a small spring constant allows the surface pressure to act on the deck surfaces adjacent the bolt holes 14 since only a small gap $S_1$ exists between the deck surfaces as shown in FIG. 4. On the contrary, as shown in FIG. 5, in the portion or region located between the adjacent bolt holes 14 (i.e., not directly adjacent the bolt holes) a large gap $S_2$ exists between the deck surfaces. The bead sector 50-2 fills this larger gap $S_2$ and has a large spring constant which allows a surface pressure substantially equal to that created by the bead sector 50-1 to act on the deck surfaces. Consequently, a substantially uniform sealing pressure is applied to the sealing portions of the opposed deck surfaces with which the bead sectors 50-1 and 50-2 come into contact as the bead 50 extends around the combustion chamber.

A compensating portion 52 is provided for the edge portion 40a of the base plate 40 around the side or periphery of the combustion chamber hole 12 in the following manner. As shown in FIG. 2, a first compensating portion 52-1 having a thickness $T_1$ is formed by attaching a first spacer 61 to the upper surface of the edge portion 40a, from which upper surface the summit of the bead sector 50-1 projects. As shown in FIG. 3, the first spacer 61 is also attached to the upper surface of the edge portion 40a between the bolt holes 14 where the summit of the bead sector 50-2 projects. A second spacer 62 is also attached to the lower surface of the edge portion 40a. The thickness of the second spacer 62 gradually increases as the distance from the bolt hole 14 increases. A second compensating portion 52-2 having a thickness $T_2$ larger than the thickness $T_1$ is thus formed at a location which is substantially midway between the adjacent pair of bolt holes 14. Thus, the edge portion 40a of the base plate 40 causes the combustion chamber hole 12 to be surrounded in a manner such that the edge regions adjacent the bolt holes 14 are surrounded by the first compensating portion 52-1 and the edge regions spaced from the bolt holes 14 are surrounded by the second compensating portion 52-2 whose thickness gradually increases as the distance from the bolt hole 14 increases. In this case, it is sufficient to provide the base plate with a spring constant for the bead sector 50-2 which is large. Therefore, the cross sectional shape of the bead sector 50-2 is not limited to the above-mentioned shape. The spring constant of the bead sector 50-2 is determined by the elastic recovery force of the base plate 40 and the bolt fastening forces which act on the joint area 26. In this case, it is obvious that the sealing pressure of the bead sector 50-2 is set to a value so as to generate the pressure necessary to prevent the leakage of combustion gas.

Referring now to FIGS. 4 and 5, an internal combustion engine is constituted by the cylinder head 22 and cylinder block 24. The metallic gasket 2 of the embodiment shown in FIGS. 1 to 3 is interposed in the joint area 26 between the cylinder head 22 and cylinder block 24. Reference numeral 28 denotes the combustion chamber and 30 is the piston.

The operation of the above embodiment will now be described.

The metallic gasket 2 interposed in the joint area 26 between the cylinder head 22 and the cylinder block 24 is compressed due to the fastening forces of fastening means such as bolts or the like which are inserted into the bolt holes 14. Thus, the bead sectors 50-1 and 50-2 are compressed and deformed and their heights are reduced. Due to the deformations, the bead sectors 50-1 and 50-2 come into contact with the opposed deck surfaces of the cylinder head 22 and cylinder block 24 and the sealing lines are formed. In this case, in the conventional metallic gasket, the surface pressure due to the bolt fastening forces at locations near the bolt holes 14 is large and the surface pressure at locations spaced from the bolt holes 14 is low. However, according to this embodiment, the spring constant of the bead sector 50-2 gradually increases as the distance from the bolt hole 14 increases, so that the elastic recovery force of the bead sector 50-2 is larger than is conventional. Thus, the reduced surface pressure due to the bolt fastening force can be sufficiently compensated and the ratio or differential in the surface sealing pressures is reduced. The sealing pressure necessary to prevent the occurrence of leakage of combustion gas can be made to uniformly act on the deck surfaces.

By providing the second compensating portion 52-2 whose thickness gradually increases as the distance from the bolt fastening portions increases, the large gap $S_2$ between the deck surfaces at a position between the bolt holes 14, which is caused due to the distortion of the cylinder head 22, can be compensated. Also, the small deck surface gap $S_1$ at a location near the bolt hole 14 can be compensated by the thinner first compensating portion 52-1. Thus, the loss of sealing pressure due to the increase and decrease of the deck surface gap due to the influences of combustion gas pressure and engine heat is prevented. The alternating load acting on the bead sectors is weakened by the compensating portion 52. The fatigues of the bead sectors 50-1 and 50-2 are prevented. The damage of the fastening bolts and cylinder head portions with which the bolts are engaged can be prevented. The reduction of the fastening forces of the bolts can be prevented. The deterioration of the sealing effect can also be prevented.

Figure 6:
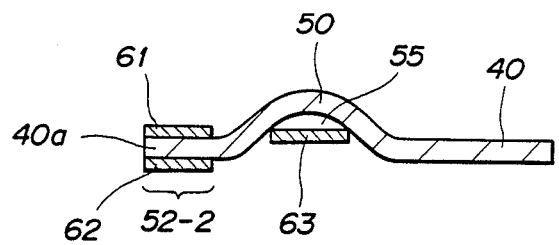
FIG. 6 is an enlarged cross sectional view showing the main part of a metallic gasket according to a second embodiment of the invention.

A second embodiment of the invention will now be briefly described with reference to FIG. 6.

A feature of the second embodiment is that the bead 50 surrounding the combustion chamber hole 12 is formed to have the same cross-sectional shape throughout its annular extent, and a third spacer 63 is provided in the groove or space 55 defined within the bead 50. This spacer 63 extends only through those sectors of bead 50 corresponding to sectors 50-2 of FIG. 1.

With this constitution of the second embodiment, the bead 50 can be formed to have the same shape around the combustion chamber hole 12, so that the metallic gasket can be easily manufactured. In addition, since the third spacer 63 is provided in the inner groove 55 of the bead 50, the decrease in spring constant of the bead 50 is prevented and the fatigue of the bead 50 is prevented. Thus, the function of the bead 50 can be preferably maintained.

In the first embodiment (FIGS. 1-3), the bead was formed such that the spring constant increases as the distance from the bolt fastening portion increases. However, for example, the material of the base plate is properly set so as to allow the bead to have a predetermined spring constant and the bead around the combustion chamber hole may be also formed to have the same shape. Due to this, the bead of the base plate can be easily manufactured.

Figure 7:
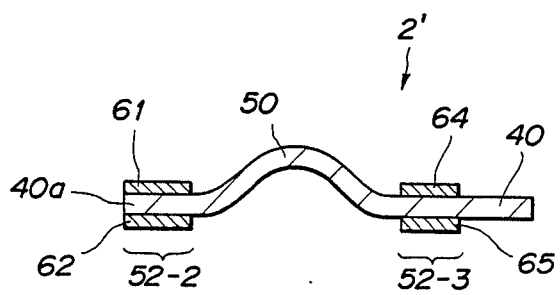
FIG. 7 is an enlarged cross sectional view showing the main part of a metallic gasket according to a third embodiment of the invention.

A third embodiment of the invention will now be briefly described with reference to FIG. 7.

A feature of the third embodiment will be summarized as follows. The metallic gasket 2' is constituted such that the first and second spacers 61 and 62 are attached to both sides of the edge portion 40a of the base plate 40 to form the second compensating portion 52-2 and, at the same time, third and fourth spacers 64 and 65 are attached to both sides of the base plate 40 outwardly of the bead 50, thereby forming a third compensating portion 52-3. With this constitution, the second and third compensating portions 52-2 and 52-3 are strongly pressed onto the deck surfaces, so that the bead 50 is not completely flattened when the cylinder head is fastened. The reduction of the recovery force of the bead 50 is prevented. The sealing performance can be preferably maintained.

As will be obvious from the above detailed description, the spring constant of the bead which is formed at locations spaced from the bolt fastening locations is large, thereby increasing the surface pressures which are applied to the deck surfaces at positions spaced away from the bolt fastening portions. Thus, the sealing pressure of the sealing portion can be uniformly applied. Also, the large gap between the deck surfaces around the combustion chamber at locations away from the bolt fastening portion is compensated for by the compensating portion. The increase and decrease in this gap due to the influences of the combustion gas pressure and engine heat are prevented, thereby allowing the sealing performance to be improved. Consequently, the leakage of the combustion gas is effectively prevented. The pollution of the metallic gasket due to the leaked combustion gas and the deterioration of the sealing effect due to the deposition of the contained material can be prevented. Further, the alternating load acting on the bead is weakened and the fatigue of the bead is prevented, thereby allowing the life of the metallic gasket to be prolonged. The damage of the fastening bolts and cylinder head portion with which the bolts are engaged can be prevented. The reduction of the fastening forces of the bolts can be prevented. A stable sealing effect can be derived. In addition, according to the invention, the constitution is simple, the metallic gasket can be easily manufactured, and the costs can be reduced.

Although the present invention has been shown and described with respect to preferred embodiments, various changes and modifications which are obvious to a person skilled in the art to which the invention pertains are deemed to lie within the spirit and scope of the invention.

What is claimed is:
1. A metallic gasket comprising:
   a base plate comprising an elastic metal plate having a combustion chamber hole and at least one bolt hole therethrough;
   an annular bead provided in said base plate so as to surround said combustion chamber hole;
   said bead having a spring constant which increases as the distance of the bead from the bolt hole increases, thereby allowing a uniform sealing pressure to be applied to a sealing portion; and compensating means provided along the edge of said combustion chamber hole of said base plate so as to surround said hole;

the thickness of said compensating means gradually increasing as the distance from the bolt hole increases.

2. A metallic gasket according to claim 1, wherein the bead has first and second sectors which are respectively close to and remote from said bolt hole, said first sector of said bead having (1) a width which is larger than that of said second sector and (2) a height which is smaller than that of said second sector.

3. A metallic gasket according to claim 2, wherein said compensating means is constituted by a first spacer which is attached onto a upper surface of the inner edge portion of said base plate in the same direction as said bead projects, and a second spacer which is attached onto a lower surface of said inner edge portion, said second spacer having a thickness which increases as the distance from the bolt hole increases.

4. A metallic gasket according to claim 1, wherein said bead is formed with the same cross-sectional shape throughout its annular extent, and wherein a spacer is provided within the inner space or groove of said bead to provide a more uniform sealing pressure along the bead.

5. A metallic gasket according to claim 4, wherein said compensating means is constituted by a second spacer which is attached onto the upper surface of the inner edge portion of said base plate in the same direction as said bead projects, and a third spacer which is attached onto the lower surface of said inner edge portion and has a thickness which increases as the distance from the bolt hole increases.

6. A metallic gasket according to claim 1, wherein said bead is formed so as to have the same cross-sectional shape throughout its annular extent, and second compensating means is provided on the base plate radially outwardly of said bead to prevent a reduction of the recovery force of said bead.

7. A metallic gasket according to claim 6, wherein the first-mentioned compensating means is constituted by a first spacer which is attached onto the upper surface of the inner edge portion of said base plate in the same direction as said bead projects, and a second spacer which is attached onto the lower surface of said inner edge portion and has a thickness which increases as the distance from the bolt hole increases.

8. A metallic gasket according to claim 7, wherein said second compensating means is constituted by third and fourth spacers which are respectively attached to the upper and lower surfaces of said base plate radially outwardly from said bead.

9. A metallic gasket according to claim 4, wherein the bead has first and second sectors which are resepectively close to and remote from said bolt hole, and said spacer is provided within the inner space or groove of said bead solely within the second sector.

10. A metallic gasket according to claim 9, wherein said compensating means is constituted by a second spacer which is attached onto the upper surface of the inner edge portion of the base plate in surrounding relationship to the combustion chamber hole in the same direction as said bead projects, and a third spacer which is attached onto the lower surface of said inner edge portion and has a thickness which increases as the distance from the bolt hole increases.

11. A metallic gasket according to claim 1, wherein said compensating means is constituted by a first spacer which is attached onto an upper surface of the inner edge portion of said base plate in the same direction as said bead projects, and a second spacer which is attached onto a lower surface of said inner edge portion, said second spacer having a thicknes which increases as the distance from the bolt hole increases.

12. A metallic gasket according to claim 11, wherein the first spacer is of essentially uniform thickness and extends completely around the combustion chamber hole, and wherein said second spacer is located only in regions between and remote from the bolt holes.

* * * * *